Sept. 21, 1965 H. F. RUNGE 3,207,368
PRODUCT METERING APPARATUS
Filed Dec. 2, 1963 4 Sheets-Sheet 1

INVENTOR.
Heinz F. Runge,
BY
Trent, Lockwood, Grunawalt & Dewey
ATTYS.

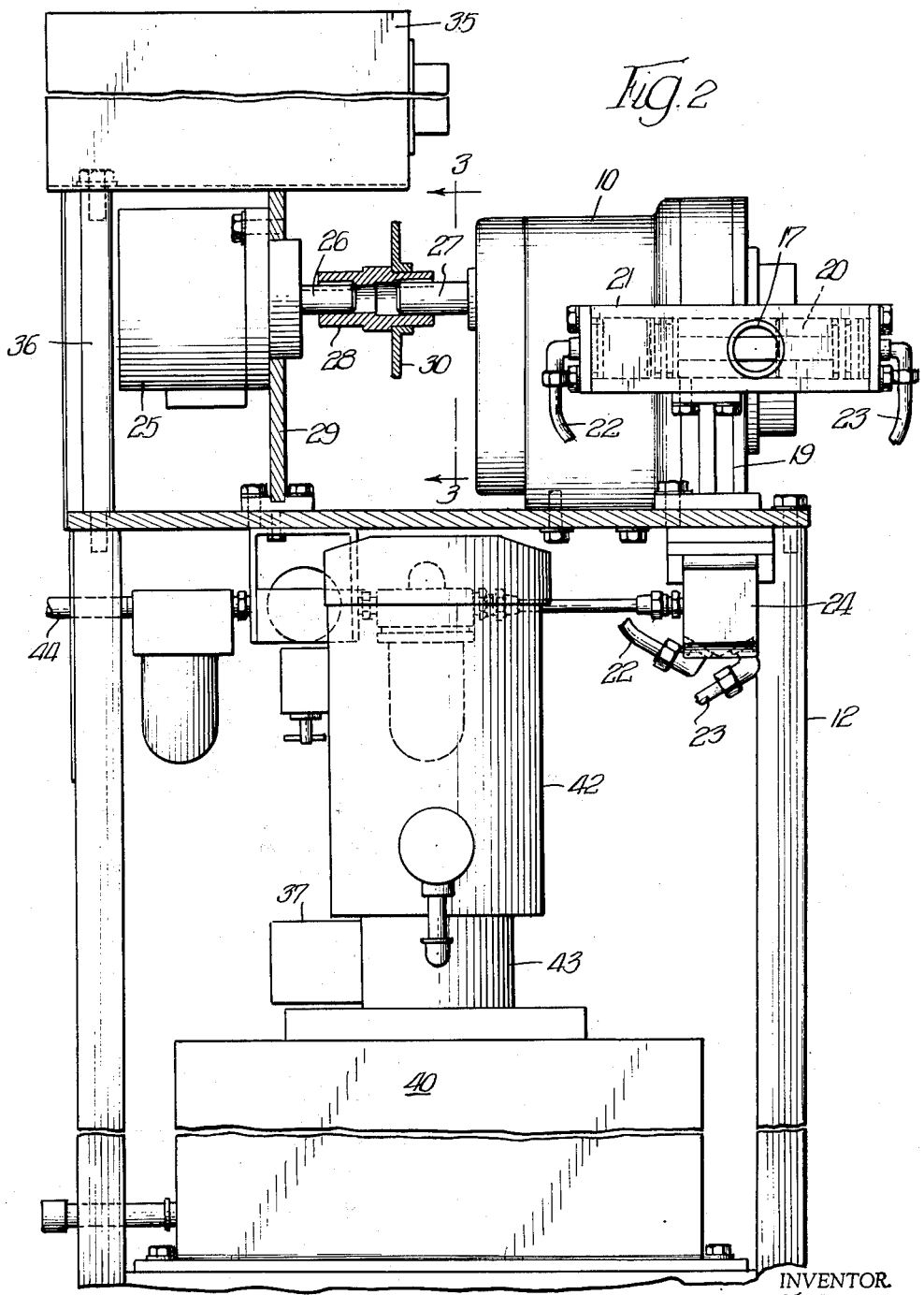

Sept. 21, 1965  H. F. RUNGE  3,207,368
PRODUCT METERING APPARATUS
Filed Dec. 2, 1963  4 Sheets-Sheet 3
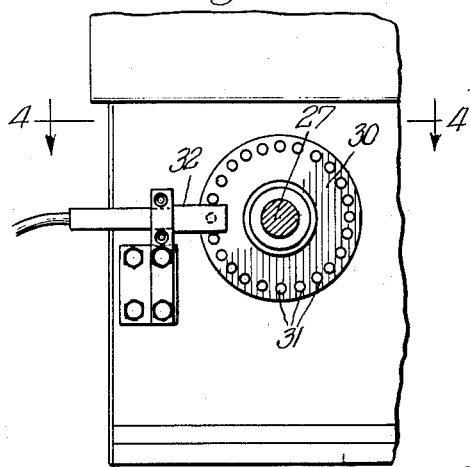
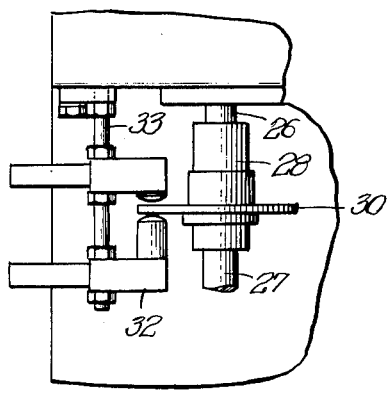
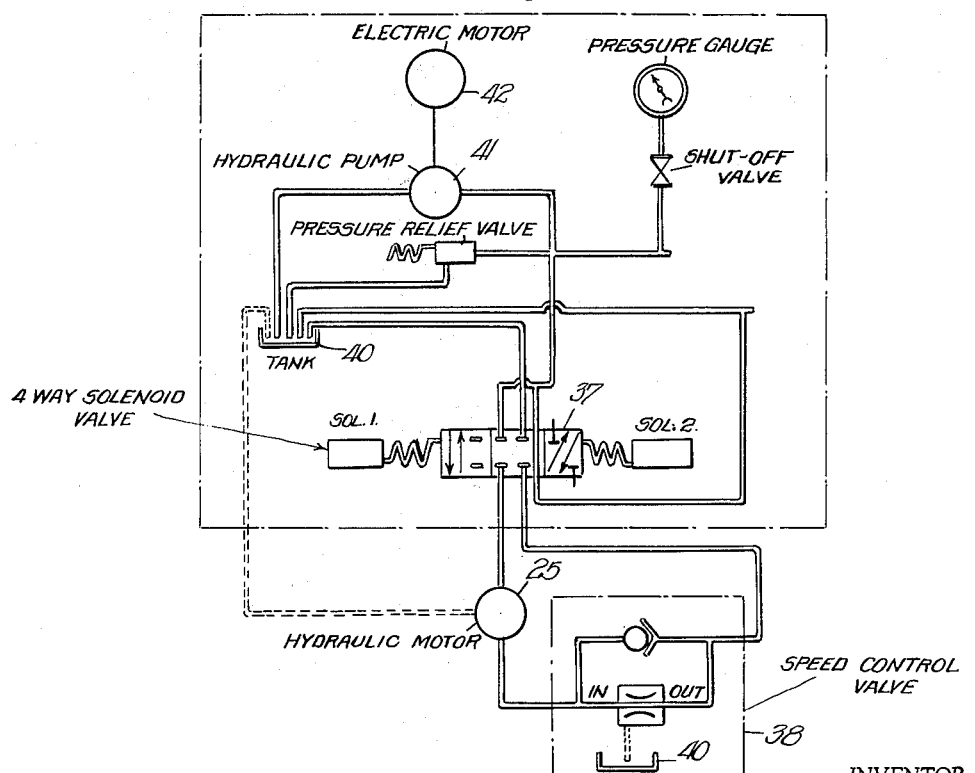
INVENTOR.
Heinz F. Runge,
BY
Strist, Lockwood, Greenawalt & Dewey
attys Sept. 21, 1965     H. F. RUNGE     3,207,368
PRODUCT METERING APPARATUS
Filed Dec. 2, 1963     4 Sheets-Sheet 4
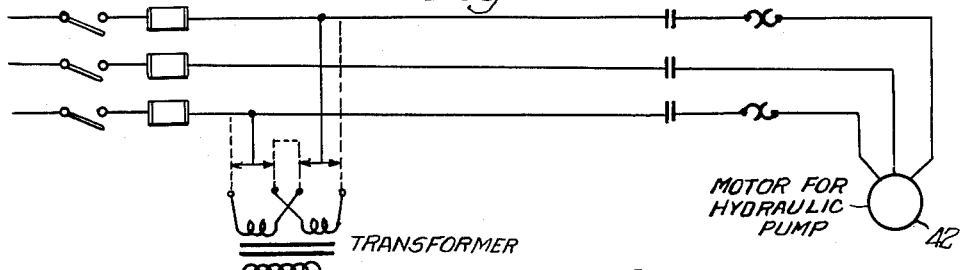
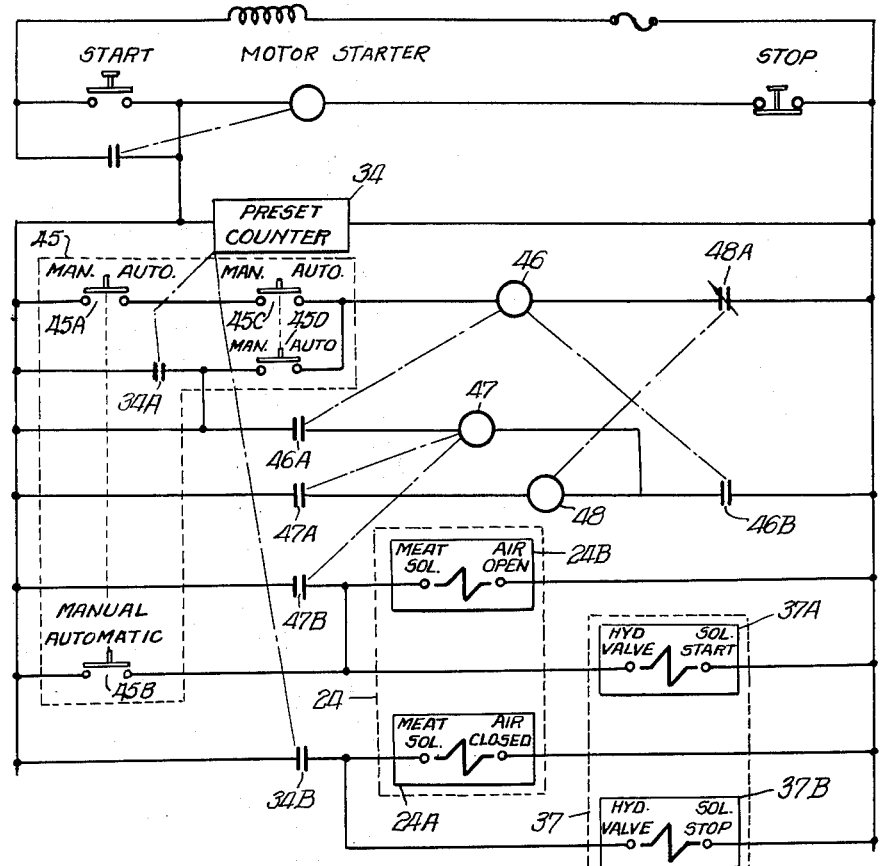
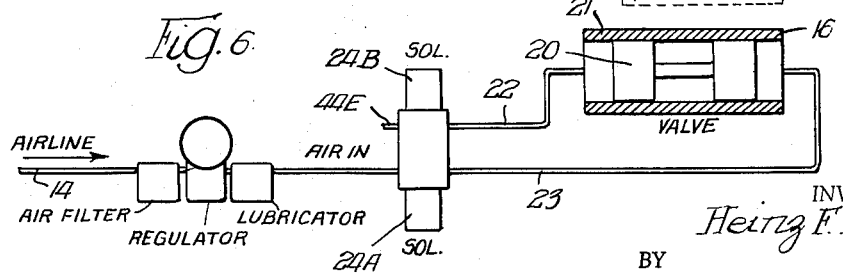
INVENTOR.
Heinz F. Runge,
BY
Greist, Lockwood, Greenawalt & Dewey
ATTYS

United States Patent Office 3,207,368
Patented Sept. 21, 1965

3,207,368
PRODUCT METERING APPARATUS
Heinz F. Runge, Mount Prospect, Ill., assignor to Oscar Mayer & Co., Inc., Chicago, Ill., a corporation of Illinois
Filed Dec. 2, 1963, Ser. No. 327,404
9 Claims. (Cl. 222—20)

This invention relates to the handling of flowable products and is more particularly concerned with improvements in apparatus for controlling the delivery of predetermined quantities of such products.

Many products such as meat emulsions, dairy products, and similar items are handled while in a fluid or flowable state and delivered into containers or formed into package units for storage and/or marketing. In most cases, it is desirable to deliver a predetermined quantity of the product for enclosing within the container or package unit and in many operations such as sausage stuffing, it is desirable to deliver successive quantities of the product which are uniform as to weight, pressure and speed of delivery. With those products which are sold in packages containing a predetermined minimum weight, it is especially desirable to be able to control accurately the weight of successive portions of the product which are delivered to a wrapping machine or the like for encasing in the container or wrapper in which the product is to be sold. Metering apparatus has heretofore been provided for products of this type which are capable of being passed through a fluid pump but it has not been possible to control the operation of such apparatus so as to obtain the desired accuracy in the delivery of successive quantities of the product. The present invention relates to metering apparatus for products of this type and it is a general object of the invention to provide an apparatus for delivering a flowable product through a fluid pump so as to control with a high degree of accuracy the pressure, weight and speed of delivery of the product.

It is a more specific object of the invention to provide apparatus for controlling the delivery of flowable products such as meat emulsions, dairy products, or the like, so as to deliver successive portions of the products with infinite control, within predetermined limits, of the speed of delivery, the pressure of the product, and the weight of each portion delivered.

It is a further object of the invention to provide apparatus associated with a fixed displacement pump which enables the operator to control with a high degree of accuracy the flow of the product through the pump so as to deliver to a wrapping machine, a casing stuffer, or any similar apparatus successive portions of the product which are uniform as to pressure, weight and speed of delivery.

Another object of the invention is to provide an apparatus for metering flowable products, such as meat emulsions, dairy products, or similar products which are capable of passing through a sanitary food pump, which apparatus includes a pre-set electronic counter for controlling the operation of the pump so as to deliver successive units of the product with uniform pressure and uniform predetermined weight.

These and other objects and advantages of the invention will be apparent from a consideration of the apparatus which is shown by way of illustration in the accompanying drawings wherein:

FIGURE 2 is a side elevational view of the apparatus of FIGURE 1, with portions broken away;

FIGURE 3 is a fragmentary sectional view taken on the line 3—3 of FIGURE 2;

FIGURE 4 is a fragmentary plan view taken on the line 4—4 of FIGURE 3;

FIGURE 5 is a schematic layout of the hydraulic control apparatus;

FIGURE 6 is a schematic layout of the pneumatic system; and

FIGURE 7 is a schematic layout showing the electrical connections between the control valves of the hydraulic and pneumatic systems and the electronic counter.

Figure 1:
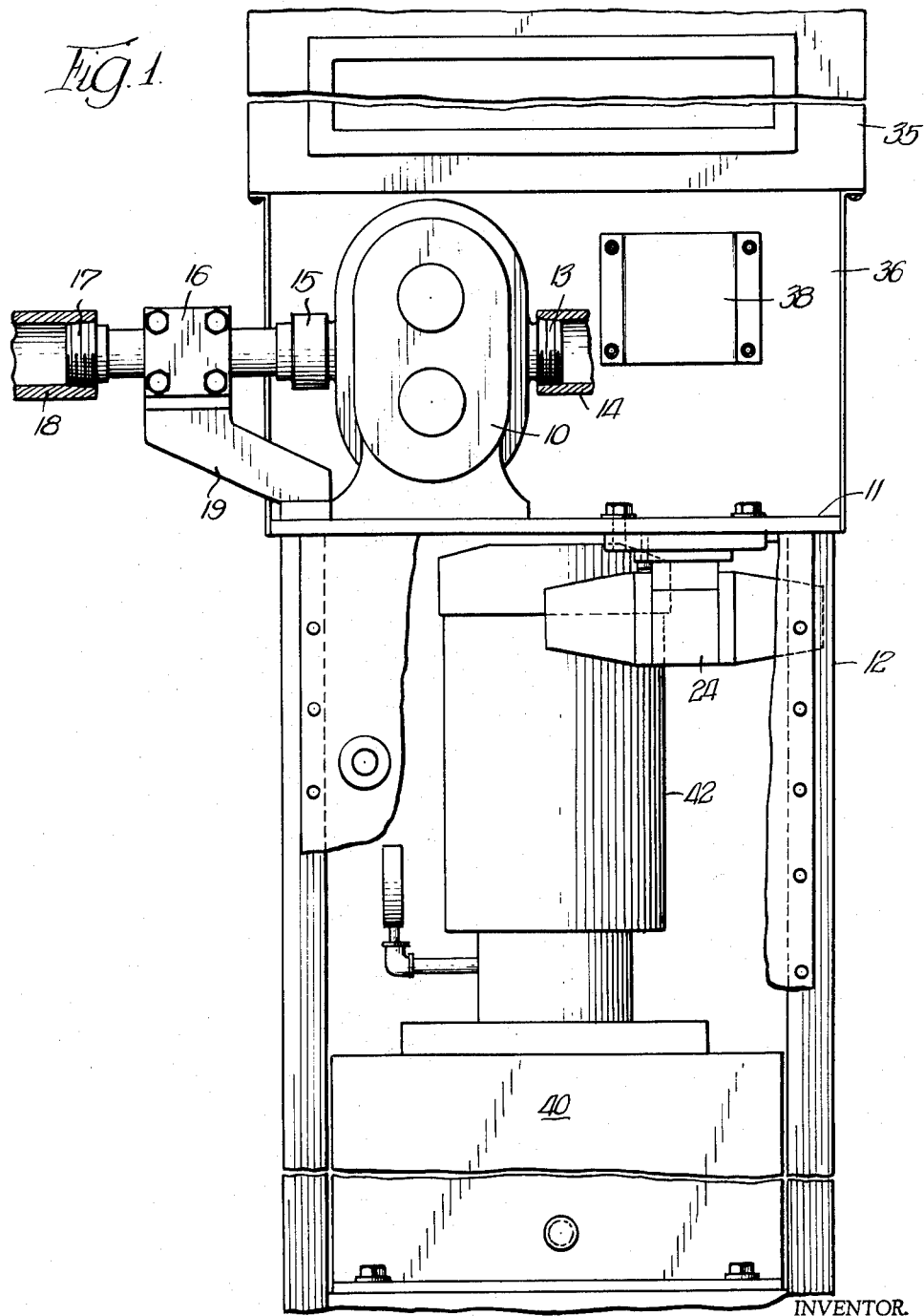
FIGURE 1 is a front elevational view of a product metering apparatus having embodied therein the principles of the invention, with portions of the apparatus broken away.

The invention is illustrated in the drawings as embodied in an apparatus for feeding a meat emulsion, for example, a sausage batter, to a stuffing horn or similar device which encases successive portions of the batter so as to form successive individual sausages.

The illustrated apparatus (FIGURES 1 and 2) comprises a motor driven sanitary food pump 10 which is mounted on the table forming top 11 of an upright supporting frame 12. The pump 10 has an infeed or inlet connection 13 to which a supply conduit indicated at 14 is connected for supplying the pump with the meat emulsion, that is, the sausage batter, which is being handled and which is in a fluid or flowable state. The pump 10 has an outlet or discharge connection 15 leading to a meat valve 16 which, in turn, has an outlet or discharge connection 17 to which a stuffing horn 18 or other member forming a discharge conduit is attached. The meat valve 16 is supported on an upstanding bracket 19 and is pneumatically operated having a reciprocating internal spool 20 and an elongate tubular outer housing 21 which is connected at its opposite ends by conduits 22 and 23 into the pneumatic system which is illustrated in FIGURE 6. The pneumatic system includes the solenoid operated control valve 24 in the lines 22 and 23 and the usual air filter, regulator and lubricator as shown.

The pump 10 is a fixed displacement pump of a type which is available commercially, such as, a Waukesha Positive Displacement Pump Model 25 DO, manufactured by Waukesha Foundry Company, Waukesha, Wisconsin. The pump 10 is driven by hydraulic motor 25, the latter having an output shaft 26 which is coupled to the drive shaft 27 of the pump 10 by the coupling sleeve 28. The motor 25 is supported on a vertically disposed bracket plate 29. A disc 30 (FIGURES 2 to 4) is carried on the coupling 28 which is provided with a plurality of perforations 31 spaced about the peripheral margin thereof for co-operation with an electric eye device 32 which is supported on the bracket 33 and which is connected with an electronic counter mechanism 34 (FIGURE 7) mounted in the housing 35, the latter being supported by the brackets 36 above the frame 12.

The electronic counter mechanism 34 controls a 4-way solenoid valve 37 in the hydraulic line which delivers fluid to the hydraulic motor 25. The hydraulic motor 25 has associated with it in the hydraulic system, a speed control valve which is indicated at 38 in FIGURES 1 and 5. The hydraulic system includes the tank 40 in which a pump, indicated at 41 in FIGURE 5, is mounted and driven by an electric motor 42 supported above the tank 40 and connected with the pump 41 through the manifold 43. The hydraulic pump 41 delivers fluid through the valve 37 for operating the hydraulic motor 25 which in turn operates the food pump 10. The valve 37 is a 4-way solenoid operated type, such as Model No. 165 TT, manufactured by Double A Products Co. (Division of Brown and Sharpe Manufacturing Co.) Manchester, Michigan.

The hydraulic valve 37 which controls the hydraulic motor 25 and the pneumatically operated valve 24 which controls the meat valve 16 are electrically controlled by the pre-set counter mechanism 34 as shown in the circuit diagram of FIGURE 7. The pre-set counter mechanism 34 is a type which is available commercially, such as the Veeder-Root predetermined counter Series A-1804 manufactured by Veeder-Root, Inc., Danvers, Massachusetts. It is actuated by the operation of a photoelectric light beam which in the present apparatus is produced by electric eye device indicated at 32 in FIGURES 3 and 4. The light beam is interrupted by means of the perforated disc 30 carried on the shaft 27 of the food pump 10. The disc 30 is perforated so as to interrupt the beam a predetermined number of times for each rotation of the pump shaft 27 thus enabling the counter mechanism 34 to record full or fractional rotations of the pump shaft 27. The electric eye mechanism 32 is connected to the counter 34 and the controls on the latter are set to produce an electric impulse when a predetermined number of shaft rotations or fractions thereof have been counted and to hold the impulse for a period corresponding to the desired interval between starting and stopping of the pump shaft rotation. The counter 35 is connected to the valves 24 and 37.

The pneumatically operated valve 24 which controls the opening and closing of the meat valve 16 is connected into a pneumatic system as shown diagrammatically in FIGURE 6 and, as indicated in FIGURE 2, having a connection with a supply line 44. The valve is operated by solenoids 24A and 24B in the ends of an external housing which reciprocate an internal valve spool in a conventional manner and which are connected into the electrical circuit as shown in FIGURE 7. When the solenoid 24A is energized, air is passed through line 23 and line 22 is opened to the valve exhaust port indicated at 44E. This moves the valve spool 20 to close the meat valve 16 and cut off the flow of meat to the outlet 17 and stuffing horn 18. When the solenoid 24B is energized air is passed through line 22 and line 23 is opened to the valve exhaust port or line 44E. This opens the meat valve 16 and permits the flow of meat to the outlet 17 and stuffing horn 18. When neither solenoid 24A or 24B is energized both lines 22 and 23 are blocked by the valve 24.

The electrical system (FIGURE 7) for operating the hydraulic pump motor 42 and the controls for the solenoid operated valves 24 and 37, which in turn control the hydraulic motor 25, includes a selector switch indicated at 45 for enabling the apparatus to be operated either manually, that is for a single cycle to deliver a single unit of the product, or automatically under the control of the electronic counter 34 to repeat the cycle and deliver successive units of the product. Selector switch 45 is provided with two sets of contacts 45A, 45B and 45C, 45D which are ganged together for simultaneous operation as indicated in FIGURE 7. When the selector switch 45 is set for manual or single cycle operation and the operating button is pushed, contacts 45C and 45D remain open while contacts 45A and 45B are closed momentarily to cause current to flow to solenoids 24B and 37A of the meat valve 16 and the hydraulic valve 37, respectively, actuating these solenoids. This starts the hydraulic motor 25 operating and pump 10 forces product to the valve 16 which is opened. This also starts the counter 34 to count the pump shaft revolutions. When the counter 34 records the number of shaft revolutions for which it is set, it closes the counter relay contacts 34A and 34B. Closing the contacts 34B energizes 24A and 37B momentarily which shuts off fluid to the hydraulic motor 25 and actuates valve 16 to cut off the flow of the product to the outlet 17. The counter 34 automatically resets for the next counting cycle but otherwise the whole operation stops until the operating button on the selector switch 45 is pushed again to engage contacts 45A and 45B for repeating the cycle. For repeated cycle operation, the selector switch 45 is set for automatic operation which closes contacts 45C and 45D and holds them closed until the selector switch is reset for manual operation. When the selector switch operating button is depressed the contacts 45A and 45B are momentarily closed and the solenoids 24B and 37A are energized to start the same operating cycle as with the manual setting on the selector switch. That is, the hydraulic motor 25 is started and the counted 34 begins to count the pump shaft revolutions. At the end of the count for which the counter 34 is set the contacts 34A and 34B close and solenoids 24A and 24B are momentarily energized to shut off the fluid supply to the hydraulic motor 25 while the valve 24 is closed and the counter is reset for the next counting cycle. At the end of the manual cycle the counter contacts 34A close and relay 46 is energized closing normally open contacts 46A and 46B which energizes an interval timer 47 and starts a predetermined time cycle for which timer 47 is set. At the end of this time cycle the contacts 47A and 47B of the timer 47 close which energizes a second interval timer 48. Timer contact 48A opens at the end of the predetermined time cycle and cuts off the power to relay 46, opening relay contact 46A and cutting off the power to the interval timer 47. The operation of the interval timers 47 and 48 occurs during the product feeding interval. The feeding cycle is, of course, automatically repeated as long as power is supplied to the system and the selector switch is set for automatic operation.

In using the apparatus, an initial determination of the weight of the product delivered by the pump 10 per rotation of the shaft 27 must be made. The speed control valve 38 for the motor 25 is set to the desired motor speed. The pressure in the hydraulic system is set at the desired figure which determines the maximum pressure on the discharge side of the food pump. The motor 42 is placed in operation which also sets the counter 34 in operation. A quantity of the product delivered by the pump 10 is then collected by rotating the pump shaft 27 a predetermined number of times and the collected product is weighed so that the weight per rotation of the pump shaft can be calculated. The pre-set counter 34 can then be set to provide the number of shaft rotations or fraction thereof required to deliver the weight of material desired during each cycle of operation of the pump 10.

While the illustrated apparatus is particularly designed for use in connection with the feeding of a meat product to a sausage stuffing apparatus, it will be understood that the invention is not limited to the handling of a particular product but it is contemplated that it may be employed in connection with the feeding of various other materials which are capable of being handled in a flowable state and which can be passed through a fixed displacement pump.

I claim:

1. In a metering apparatus for a flowable product, a product supply line, a pump in said supply line having a rotatable drive shaft and associated mechanism for forcing the product through the pump, a hydraulic motor having a drive shaft coupled with the drive shaft of said pump, means for supplying fluid to operate said hydraulic motor, a valve controlling the flow of operating fluid to said hydraulic motor, a disc carried by said pump drive shaft, a counter mechanism actuated in response to rotation of said disc and having a connection with the valve controlling the flow of fluid to said motor for actuating said valve to stop the pump shaft at intervals determined by said counting mechanism and thereby stop the delivery of the product through the pump.

2. In a metering apparatus for a flowable product, a product supply line, a pump connected to said supply line, said pump having a rotatable drive shaft and associated mechanism for forcing the product through the pump, a hydraulic motor having a drive shaft coupled with the drive shaft of said pump, a fluid supply for operating said hydraulic motor, a valve controlling the flow of operating fluid to said hydraulic motor, a disc carried by said pump drive shaft, a counter mechanism actuated in response to rotation of said disc, said counter mechanism having a connection with the valve for controlling the flow of operating fluid to the hydraulic motor whereby said valve is operated to stop the pump at intervals determined by said counter mechanism.

3. In a metering apparatus as recited in claim 2, and a product valve connected to the discharge outlet of said pump, and said counter mechanism having a connection with said product valve for cutting off the flow of the product simultaneously with the stopping of the pump.

4. In a metering apparatus for a flowable product, a product supply line, a pump in said supply line having a rotatable drive shaft and associated mechanism for forcing the product through the pump, a motor having a drive shaft coupled with the drive shaft of said pump, means controlling the speed of said motor, a counter mechanism actuated in response to rotation of said pump drive shaft and having a connection with said motor speed controlling means whereby to stop the pump at intervals determined by said counting mechanism and thereby stop the delivery of the product through the pump.

5. In a metering apparatus for a flowable product, a product supply line, a pump in said supply line having a rotatable drive shaft and associated mechanism for forcing the product through the pump, a motor having a drive shaft coupled with the drive shaft of said pump, means controlling the speed of said motor, a disc carried by said pump drive shaft, a counter mechanism actuated in response to rotation of said disc and having a connection with said motor speed controlling means whereby to stop the pump at intervals determined by said counting mechanism and thereby stop the delivery of the product through the pump.

6. In a metering apparatus for a flowable product, which apparatus includes a product pump having a rotating drive shaft, a product supply line connected to the pump inlet, a product cut-off valve connected to the pump outlet, a hydraulic motor for driving the pump, said motor having a drive shaft connected to the pump drive shaft, a perforated disc mounted on one of said drive shafts, an electric eye mechanism associated with said perforated disc and operated by rotation of said disc, a counter mechanism controlled by said electric eye mechanism so as to count the revolutions of the pump drive shaft, a valve for controlling the operation of said hydraulic motor so as to stop and start said pump, a fluid supply line connected to said hydraulic motor, a pressure pump in said fluid supply line for delivering fluid through said motor control valve to said hydraulic motor, and means connecting said counter mechanism with said motor control valve so as to start and stop the rotation of said pump shaft in response to a predetermined number of rotations of said shaft.

7. In a metering apparatus for a flowable product, which apparatus includes a product pump, a product supply line connected to the pump inlet, a product cut-off valve connected to the pump outlet, a hydraulic motor for driving the pump, a perforated disc mounted on the pump drive shaft, an electric eye mechanism associated with said perforated disc and operated by rotation of said disc, a counter mechanism controlled by said electric eye mechanism so as to count the revolutions of the pump drive shaft, a fluid supply connected by a line with said hydraulic motor, a valve in said supply line for controlling the delivery of fluid to said hydraulic motor so as to stop and start said pump, a valve in said supply line for controlling the speed of said hydraulic motor, a pressure pump in said fluid supply line for delivering fluid through said control valve to said hydraulic motor, and means connecting said counter mechanism with said motor control valve so as to start and stop the rotation of said product pump in response to the amount of rotation of said pump shaft.

8. A metering apparatus for a flowable product, said apparatus including a product pump, a product supply line connected to the pump inlet, a product cut-off valve connected to the pump outlet, a hydraulic motor for driving the pump, the motor and pump having connected drive shafts, a perforated disc mounted on one of said drive shafts, an electric eye mechanism associated with said perforated disc and operated by rotation of said disc, a counter mechanism controlled by said electric eye mechanism so as to count the revolutions of the pump drive shaft, a solenoid operated valve for controlling the operation of said hydraulic motor so as to stop and start said pump, a fluid supply connected by a line with said hydraulic motor, a pressure pump in said fluid supply line for delivering fluid through said control valve to said hydraulic motor, an electric circuit connecting said counter mechanism with the solenoid for operating said motor control valve so as to start and stop the rotation of said product pump in response to a predetermined number of rotations of said pump shaft, and a manually operated selector switch assembly in said electrical circuit for controlling said counter mechanism so as to provide single cycle or automatically repeated cycle operation.

9. A metering apparatus for a flowable product, which apparatus comprises a product pump, a product supply line connected to the pump inlet, a solenoid operated pneumatic valve connected to the pump outlet for cutting off the flow of the product from the pump, a hydraulic motor for driving the pump, the motor and pump having connected drive shafts, a perforated disc mounted on one of said drive shafts, an electric eye mechanism associated with said perforated disc and operated by rotation of said disc, an electronic counter mechanism controlled by the said electric eye mechanism so as to register the amount of rotation of the pump drive shaft, a solenoid operated hydraulic valve for controlling the operation of said hydraulic motor so as to stop and start said pump, a fluid supply connected by a line with said hydraulic motor, a pressure pump in said fluid supply line for delivering fluid through said control valve to said hydraulic motor, an electrical circuit connecting said counter mechanism with the solenoids for operating said motor control valve and said product cut-off valve so as to start and stop the delivery of said product in response to predetermined rotation of said pump shaft.

References Cited by the Examiner

UNITED STATES PATENTS

| 2,585,821 | 2/52 | Mueller | 222—20 |
| 2,759,633 | 8/56 | Ross | 222—59 |
| 2,787,402 | 4/57 | Stiner et al. | 222—76 |

LOUIS J. DEMBO, *Primary Examiner.*